Aug. 17, 1937.  A. D. OWEN  2,089,980
FOOD PREPARING IMPLEMENT
Original Filed Sept. 2, 1933
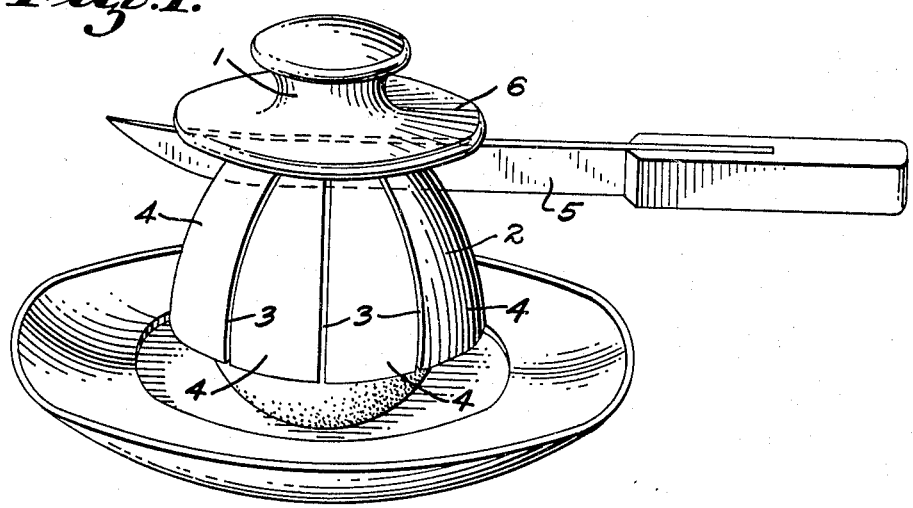
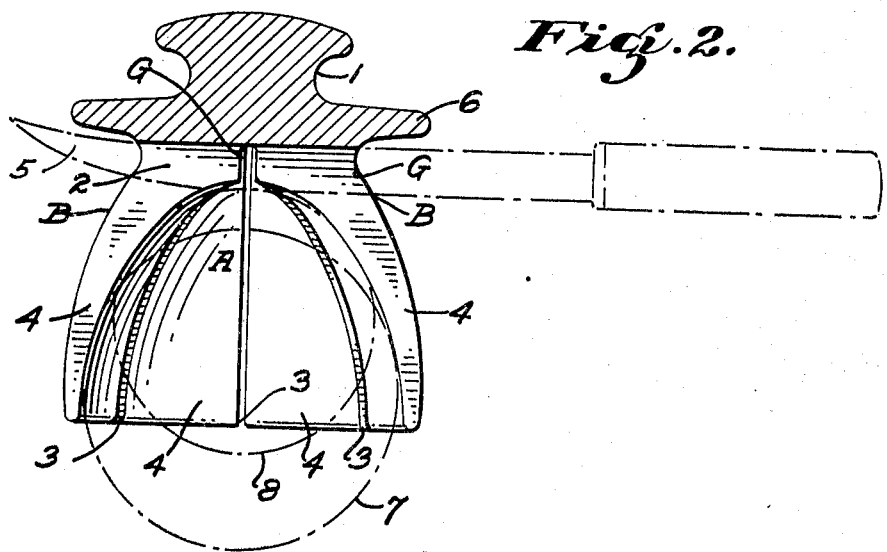
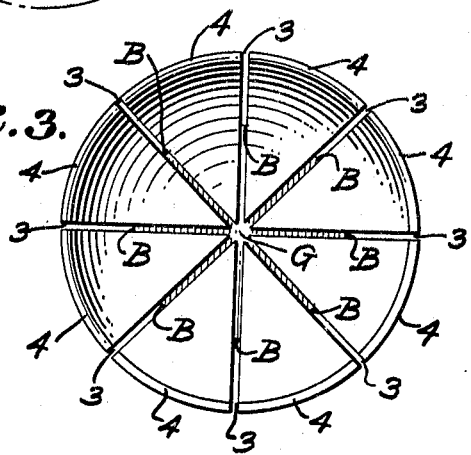
INVENTOR.
A. Denham Owen Patented Aug. 17, 1937

2,089,980

UNITED STATES PATENT OFFICE 2,089,980

FOOD PREPARING IMPLEMENT

Allison Donham Owen, Berkeley, Calif.

Original application September 2, 1933, Serial No. 687,971. Divided and this application November 29, 1935, Serial No. 52,021

7 Claims. (Cl. 146—150)

The present invention provides a novel implement or tool for use in the slicing of fruit, vegetables, or other spherical or near spherical objects.

This application is a division of applicant's copending application Serial No. 687,971, filed September 2, 1933.

For the purposes of this explanation the device will be described as used with fruit. It will become obvious as this description proceeds that its use is identical with either a fruit, a vegetable, or any other object a portion of whose surface will fit beneath the skirt.

Certain fruits such as oranges are probably the most difficult of all fruits to prepare for eating and in many instances people are deterred from eating oranges because of this difficulty. It is this fact also which has led to the wide use of orange juice extractors.

The present invention has met with instant acceptance as providing a solution to the problem of easily preparing an orange to be eaten in the most appetizing way known. When an orange has been prepared by use of this invention there is uncovered on the double surface of each section the fruit juice held in suspension by the solid particles and these surfaces contact the delicate taste nerves of the lips and mouth giving the maximum taste sensation. It is therefore the object of the present invention to provide a skirt, cap, or plurality of fingers, conforming on the inside to the contour of a hemispheroid and adapted to be placed on the top of the object to be sectioned; to provide a cap, or skirt, slotted to provide free passage for the knife used in cutting the fruit, the number of slots depending on the number of sections desired; to provide wings, formed by dividing the skirt, to support the sections of fruit underlying them until the cap is lifted off the object; to provide narrow slots between the wings to serve as a guide for the knife in cutting, although a guide all the way down the side is not absolutely necessary, so long as the index slots for the knife are in the handle or upper part; to provide indexing slots in that part of the tool above the fruit-receiving cavity, usually the handle, to properly guide the knife at the start of each cut; to provide a means of holding the sections in place during the cutting operation; and to provide other advantages which will appear hereinafter.

These objects may be attained by the structure illustrated in the accompanying drawing, in which—

Fig. 1 is a view in perspective of the invention shown in operating position on a piece of fruit placed in a saucer and with a knife inserted through one of the indexing slots about to begin a cut;

Fig. 2 is a vertical section taken through the center of the structure of Fig. 1, also showing the knife and two different sized pieces of fruit represented in dotted lines; and Fig. 3 is a plan view of the bottom of the structure of Fig. 2, showing the indexing slots.

As shown and illustrated, the invention is comprised of a handle 1 from which depends a hollow hemispheroidal skirt 2, the latter being slotted at 3 to provide a plurality of wings or supporting members 4. These supporting wall sections 4 have in the horizontal plane a generally circular contour on the inside with gradually diminishing diameters from bottom to top. The contour of the inside of the skirt thus is adapted to fit fruit of varying sizes, as will be seen from the dotted lines 7 and 8 in Fig. 2. The smallest diameter fruit 8 that can be used with a particular tool is determined by the vertical depth of the cavity and should at least equal it. The largest diameter fruit that can be sectioned is that which is not so large but what the wings 4 can get a reasonably firm grip on each section. The contour on the outside of the wall sections may be whatever the designer desires as it has no particular functional utility.

It is preferable for the slots or passageways 3 to extend up into the handle 1 or above the top of cavity A to provide there the indexing means G. This allows the device to rest on even the smallest sized fruit while at the same time permitting insertion of the knife through the guide slots 3 without its having to make a substantial cut through the fruit. In other words, on each insertion of the knife there is little or no tendency to disturb the position of the fruit under the hood. This is clearly seen in Fig. 2 where the knife 5 (shown in dotted lines) is passing well above the fruit 7 or 8 (shown in dotted lines) under the skirt.

It is also preferable that these slots G be cut in the solid part of the skirt and handle so as to provide a walled guideway for the knife point during insertion. This guideway G extends from B to B (see Figs. 2 and 3) above the top of the cavity A. Without it, there might be a tendency for the knife point to be diverted and strike the opposite inside wall of the skirt instead of the slot. Where the device is made, for instance, from metal stampings these walled knife-guide slots may be formed during the stamping operation or by the addition of a plug which is slotted to conform to the slots in the skirt and handle.

As a protection against cutting the fingers engaging the handle 1, a rim 6 of suitable size may be provided between the handle proper 1 and the top of the indexing slots G.

The dotted lines 7 and 8 in Fig. 2 represent respectively a medium and a small sized piece of fruit within the hollow hemispheroidal skirt, and show the importance of the proper contour for the cavity.

In the form shown in Figs. 1 to 3, the invention may best be made of metal, glass, wood, plaskon, bakelite, or any equivalent substance. Also it is obvious that the parts are subject to modification in design and shape while still retaining their functions as described herein.

In operation, the form of the invention described, and many other possible modifications are alike. The fruit may be placed in a saucer or on a cutting board, and in the case of an orange or grapefruit, the navel may be placed at the bottom, the stem at the top. In the case of an apple, the core line may be placed in a vertical position. In cutting lettuce the hard stem may be placed at the bottom. The operator takes the tool in one hand engaging it by the handle 1, places the skirt over the fruit 7 (see Fig. 1) and bears down on the handle 1 to securely position the fruit. This pressure is maintained during the whole cutting operation. The knife 5 is inserted in the indexing slot G and is pushed horizontally, preferable to the position shown in Fig. 2. The downward cut is then begun and the knife removed when it has cut through the object. The handle is rotated, also rotating the fruit, until the next indexing slot G is brought into line with the knife, and the knife is inserted as before and another cut is made. This is repeated until the knife has made all the cuts, each of which is intersected by the others. The implement is then removed vertically, thereby removing the support wings 4 from the fruit sections and the latter usually unfold on the saucer in the form of a star.

The cuts made in the fruit may or may not be carried through to the bottom. For instance, where oranges are prepared at home for use on a picnic some hours later, I prefer not to cut through the last quarter inch of skin at the bottom. This holds the sections together at the bottom and I place a rubber band or string around the waist of the fruit to hold the sections together. I find there is no lost juice as the skin seems to weld itself along the cuts. At the picnic the rubber band is removed and the sections are separated one by one as they are eaten.

I contemplate that subsequent manufacture may suggest modifications of the preferred structure herein described, either as to shape, size, and arrangement of parts, without departing from the spirit of my invention, or the scope of the subjoined claims.

Having thus described my invention, I claim:

1. In an implement adapted to be placed over the top of an article of generally spherical shape while sectioning the same by a series of intersecting cuts made successively with a horizontally drawn knife, the combination of a handle having intersecting knife-guide passageways in its lower portion, said passageways extending up into said handle far enough to allow a knife to be inserted horizontally over the top of the article without cutting into it substantially, and supporting wall sections depending from said handle adapted to hold the article during the cutting operation.

2. In an implement adapted to be placed over the top of an article of generally spherical shape while sectioning the same by a series of intersecting cuts made successively with a horizontally drawn knife, the combination of a handle having intersecting, walled knife-guide passageways in its lower portion, said passageways extending into said handle far enough to allow a knife to be inserted horizontally over the top of the article without cutting into it substantially, and supporting wall sections depending from said handle adapted to hold the article during the cutting operation.

3. In an implement adapted to be placed over the top of an article of generally spherical shape while sectioning the same by a series of intersecting cuts made successively with a horizontally drawn knife, the combination of a handle having intersecting, walled knife-guide passageways to guide the point of the knife during its insertion horizontally, and supporting wall sections depending from said handle adapted to hold the article during the cutting operation.

4. In an implement adapted to be placed over the top of an article of generally spherical shape while sectioning the same by a series of intersecting cuts made successively with a horizontally drawn knife, the combination of a handle having intersecting knife-guide passageways in its lower portion, said passageways extending into said handle far enough to allow a knife to be inserted horizontally over the top of the article without cutting into it substantially, and supporting wall sections having in the horizontal plane a generally circular contour on the inside with gradually diminishing diameters from bottom to top so as to fit spherical articles of varying diameters.

5. A device adapted to be placed over the top of an article of generally spherical shape while slicing the same with a knife, comprising a handle, a rim extending outwardly in a generally horizontal plane from said handle near its lower end, indexing slots cut in the lower end of said handle beneath said rim, and supporting wall sections having in the horizontal plane a generally circular contour on the inside with gradually diminishing diameters from bottom to top so as to fit spherical articles of varying diameters.

6. A device adapted to be placed over the top of an article of generally spherical shape while slicing the same with a knife, comprising a handle, indexing slots cut in the lower end of said handle, and supporting wall sections having in the horizontal plane a generally circular contour on the inside with gradually diminishing diameters from bottom to top so as to fit spherical articles of varying diameters.

7. In a spherical object sectioner of the type adapted to be placed over the top of a spherical object and held thereon by one hand while the other hand passes a knife through slots therein with a reciprocatory horizontal motion, the combination of a body member having a generally circular or cup shaped interior dome-like chamber and vertical slots cut in said body, a handle member formed above said body member, said slots passing up into said handle member above the top of said dome-like chamber for a distance sufficient to allow a horizontally entering knife to pass through said slots one at a time, without the cutting edge on said knife being forced to project down into the space below the uppermost tip of the dome and into contact with an object held thereunder.

A. DONHAM OWEN.